Patented Aug. 10, 1954

2,686,187

UNITED STATES PATENT OFFICE 2,686,187

4-HALO -21- CHLOROPREGNAN -17α- OL- 3,11,20-TRIONES AND PREPARATION THEREOF

Raymond O. Clinton, North Greenbush, N. Y., assignor to Sterling Drug Inc., New York, N. Y., a corporation of Delaware No Drawing. Application April 29, 1952, Serial No. 285,069

6 Claims. (Cl. 260—397.45)

This invention relates to new chemical compounds, 4-halo-21-chloropregnan-17α-ol-3,11,20-triones, and to their preparation. In particular the invention relates to 4-bromo-21-chloropregnan-17α-ol-3,11,20-trione and 4-iodo-21-chloropregnan-17α-ol-3,11,20-trione.

These substances are useful as intermediates in the preparation of adrenal cortical hormones. In a few steps they can be converted into the important hormone known as cortisone. This is accomplished by treating the 4-halo-21chloropregnan-17α-ol-3,11,20-trione with hydrazine or a substituted hydrazine to remove the elements of hydrogen halide from the 4- and 5-positions, hydrolyzing the resulting hydrazone of 21-chloro-4-pregnen-17α-ol-3,11,20-trione to 21-chloro-4-pregnen-17α-ol-3,11,20-trione, and treating the latter with a metallic acetate to produce cortisone acetate.

The 4-halo-21-chloropregnan-17α-ol-3,11,20-triones are prepared by halogenation of 21-chloropregnan-17α-ol-3,11,20-trione in the 4-position. 21-chloropregnan-17α-ol-3,11,20-trione is described in the copending application of R. O. Clinton, Serial No. 259,510, filed December 1, 1951, now abandoned. 21-Chloropregnan-17α-ol-3,11,20-trione is in turn prepared by oxidation of 21 - chloropregnane - 3,17α - diol - 11,20-dione which is described in the copending application of W. S. Johnson and R. O. Clinton, Serial No. 253,012, filed October 24, 1951, now abandoned.

4 - bromo - 21 - chloropregnan - 17α - ol - 3,11,20-trione can be prepared by direct bromination of 21-chloropregnan-17α-ol-3,11,20-trione in the presence of an acceptor for strong acids such as an alkali metal salt of a weak acid, for example, sodium acetate. The purpose of the latter is to take up the hydrogen bromide produced in the reaction. However this method is not very satisfactory because the yields are low and the product is difficult to purify due to competitive side reactions dependent upon the amount of bromine used and the rate of its addition. Results are not easily duplicated because of the difficulty of measuring quantities of elementary bromine accurately.

A preferred method for the prepartion of 4-bromo - 21 - chloropregnan - 17α - ol - 3,11,20-trione comprises treating 21-chloropregnan-17α-ol-3,11,20-trione with pyridinium bromide perbromide (pyridine hydrobromide dibromide, C₅H₅N.HBr.Br₂). It is advantageous to use less than an equivalent amount of pyridinium bromide perbromide as it has been found to be easier to separate the desired 4-bromo-21-chloropregnan-17α-ol-3,11,20-trione from unreacted 21-chloropregnan-17α-ol-3,11,20-trione than from the byproducts formed when a full equivalent of brominating agent is used. The unbrominated starting material is significantly less soluble in most solvents than the 4-bromo derivative, and the former can be readily recovered and recycled if desired. The reaction of the steroid with pyridinium bromide perbromide alone gives a mixture of the 2-bromo and 4-bromo steroids. To prevent formation of the 2-bromo isomer it is desirable to add an equivalent amount of an acid acceptor such as an alkali metal acylate, for example, sodium acetate, to take up the hydrogen bromide formed in the reaction. If the acid acceptor is added, it is necessary to add a trace of hydrogen bromide as a catalyst before introduction of the brominating agent and the acid acceptor.

The bromination reaction takes place in an inert organic solvent. Appropriate solvents are well-known to the organic chemist and are those in which steroids are readily soluble and which do not themselves react with the brominating agent. Lower fatty acids are especially useful solvents, in particular acetic acid.

4 - iodo - 21 - chloropregnan - 17α - ol - 3,11,20-trione is prepared by direct iodination of 21-chloropregnan-17α-ol-3,11,20-trione using elementary iodine in the presence of an epoxide, preferably of the glycidyl ether type,

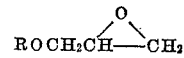

wherein R is a hydrocarbon radical of about 1 to 8 carbon atoms, including lower alkyl radicals such as methyl, isopropyl, hexyl and the like, alkenyl radicals such as allyl, pentenyl and the like, cycloalkyl radicals, and aryl radicals such as phenyl, thienyl and xylenyl. The reaction takes place in an inert polar organic solvent such as a lower aliphatic alcohol or a lower fatty acid.

If the 4-iodo-21-chloropregnan-17α-ol-3,11,20-trione is desired as an intermediate for the preparation of cortisone, it need not be isolated but may be treated directly in solution with hydrazine or a substituted hydrazine to introduce a double bond in the 4,5-position.

The following examples will further illustrate the invention.

EXAMPLE 1

*4-bromo-21-chloropregnan-17α-ol-3,11,20-trione*

21-chloropregnan-17α-ol-3,11,20-trione (19.05 g., 0.05 mole, M. P. 238.2–239.6° C.) was dissolved with stirring and heating in 950 ml. of glacial acetic acid. The solution was cooled to about 26° C. and 1.0 ml. of a 30% solution of hydrogen bromide in acetic acid was added, followed by dropwise addition with vigorous stirring over a period of two and one-half hours of a solution of 12.72 g. of pyridinium bromide perbromide (94.4%, 0.0375 mole) and 5.10 g. of sodium acetate trihydrate (0.0375 mole) in 150 ml. of acetic acid. A pale yellow solution was obtained containing some crystalline material (A) which was filtered off and washed with a little acetic acid. The combined acetic acid filtrate and washings were diluted slowly with stirring with 500 ml. portions of water until 2500 ml. of water had been added. The solid product thus obtained was collected by filtration and washed with 2000 ml. of water and dried at 70° C. to constant weight (13.95 g.). The latter material was boiled for one minute with 100 ml. of ethyl acetate, cooled in ice for fifteen minutes, and the crystallized product (B) was collected by filtration and washed with 20 ml. of cold ethyl acetate. The ethyl acetate filtrate and washings were concentrated to 40 ml. and diluted with 180 ml. of absolute ether. A further crystalline product was thus obtained which was collected by filtration, washed with ether and dried at 50° C. giving 8.75 g. of 4-bromo-21-chloropregnan-17α-ol-3,11,20-trione, M. P. 184–185° C. (dec.). This compound was further purified by recrystallization from dilute acetone and then from methanol followed by drying in a vacuum oven at 55° C. for seven hours, giving a sample melting at 189.8–190.2° C. (dec.), $[\alpha]_D^{25} = +113.9°$ (1% in chloroform).

*Anal.*—Calcd. for $C_{21}H_{28}BrClO_4$: C, 54.85; H, 6.14; Br, 17.38. Found: C, 55.34; H, 6.52; Br, 17.54.

The more sparingly soluble materials (A and B) collected after completion of the reaction and again during the purification stage proved to be unreacted 21-chloropregnan-17α-ol-3,11,20-trione, and this could be used over again in another bromination reaction.

EXAMPLE 2

*4-iodo-21-chloropregnan-17α-ol-3,11,20 - trione and its conversion to 21-chloro-4-pregnen-17α-ol-3,11,20-trione 3 - (2,4 - dinitrophenylhydrazone)*

A mixture of 7.62 g. (0.02 mole, M. P. 234–236° C.) of 21-chloropregnan-17α-ol-3,11,20-trione, 5.08 g. (0.02 mole) of powdered iodine, 7.0 g. (0.06 mole) of glycidyl isopropyl ether and 100 ml. of glacial acetic acid was stirred and heated until the internal temperature reached about 110° C. The iodine uptake was complete in about five minutes, and all traces of sublimed iodine were rinsed down into the reaction mixture with 20 ml. of acetic acid. There was thus obtained a solution containing 4-iodo-21-chloropregnan-17α-ol-3,11,20-trione.

The solution of 4-iodo-21-chloropregnan-17α-ol-3,11,20-trione obtained above was cooled to 70° C., a nitrogen atmosphere was introduced, and 4.80 g. (0.0242 mole) of 2,4-dinitrophenylhydrazine was added with the aid of 100 ml. of chloroform. The mixture was refluxed under nitrogen for one hour with the internal temperature at 83–90° C. The mixture was then concentrated in vacuo to a volume of about 30 ml., 100 ml. of absolute ether was added, and the solution was cooled to 0° C. for four hours. The resulting solid was collected by filtration and dried giving 7.65 g. of the 3-(2,4-dinitrophenylhydrazone) of 21-chloro-4-pregnen-17α-ol-3,11,20 - trione, M. P. 205–207° C. (dec.). The hydrazone was recrystallized twice by dissolving it in chloroform, filtering the solution, adding acetic acid and concentrating the solution to a small volume until most of the chloroform was removed. Thus was obtained a purified sample of the 3-(2,4-dinitrophenylhydrazone) of 21-chloro-4-pregnen-17α-ol-3,11,20-trione, M. P. 224–224.5° C., ultraviolet absorption maximum (in $CHCl_3$) E=28,649 at 384 mμ.

*Anal.*—Calcd. for $C_{27}H_{31}ClN_4O_7$: C, 58.01; H, 5.59; N, 10.02. Found: C, 58.06; H, 5.72; N, 9.80.

EXAMPLE 3

A mixture of 3.81 g. of 21-chloropregnan-17α-ol-3,11,20-trione, 2.54 g. of powdered iodine, 6.0 g. of glycidyl phenyl ether and 100 ml. of anhydrous ethanol was stirred and refluxed under anhydrous conditions for three and one-half hours. There was thus obtained a solution containing 4-iodo-21-chloropregnan-17α-ol-3,11,20-trione.

I claim:

1. A compound having the formula

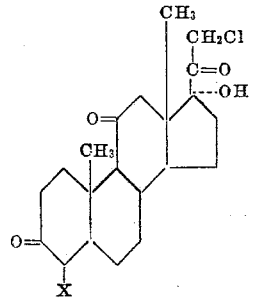

wherein X is a member of the group consisting of bromine and iodine.

2. 4 - bromo-21-chloropregnan-17α-ol-3,11,20-trione.

3. 4 - iodo - 21 - chloropregnan-17α-ol-3,11,20-trione.

4. A process for preparing 4-bromo-21-chloropregnan-17α-ol-3,11,20-trione which comprises treating 21-chloropregnan-17α-ol-3,11,20-trione in an inert organic solvent with a member of the group consisting of bromine and pyridinium bromide perbromide.

5. A process for preparing 4-bromo-21-chloropregnan-17α-ol-3,11,20-trione which comprises adding a trace of hydrogen bromide to an acetic acid solution of 21-chloropregnan-17α-ol-3,11,20-trione and adding slightly less than equivalent amounts of pyridinium bromide perbromide and an alkali metal acylate.

6. A process for preparing 4-iodo-21-chloropregnan-17α-ol-3,11,20-trione which comprises heating 21-chloropregnan-17α-ol-3,11,20-trione with about one equivalent of elementary iodine in an inert polar organic solvent in the presence of an epoxide having the formula

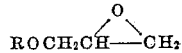

wherein R is a hydrocarbon radical having from 1 to 8 carbon atoms.

References Cited in the file of this patent

UNITED STATES PATENTS

| Number | Name | Date |
|---|---|---|
| 2,401,775 | Reichstein | June 11, 1946 |
| 2,541,104 | Sarett | Feb. 13, 1951 |